Oct. 8, 1940.  A. P. FERGUESON  2,217,046
FENDER SKIRT LATCHING MECHANISM
Original Filed Oct. 9, 1936  2 Sheets-Sheet 1
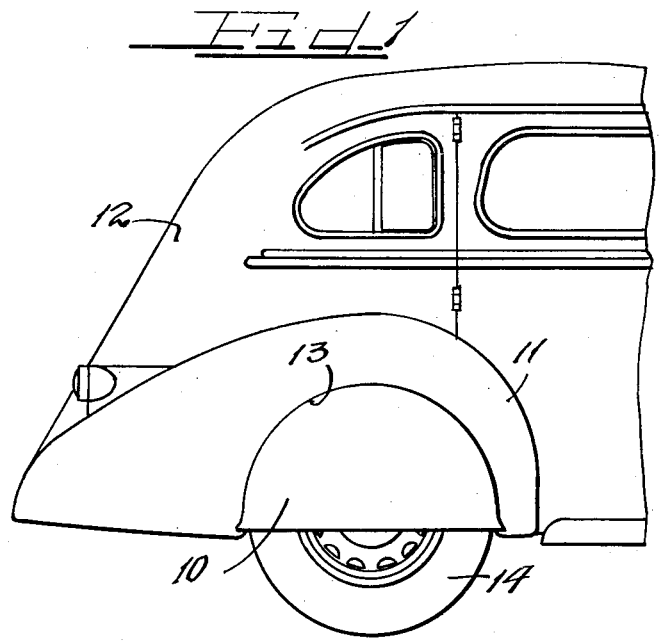
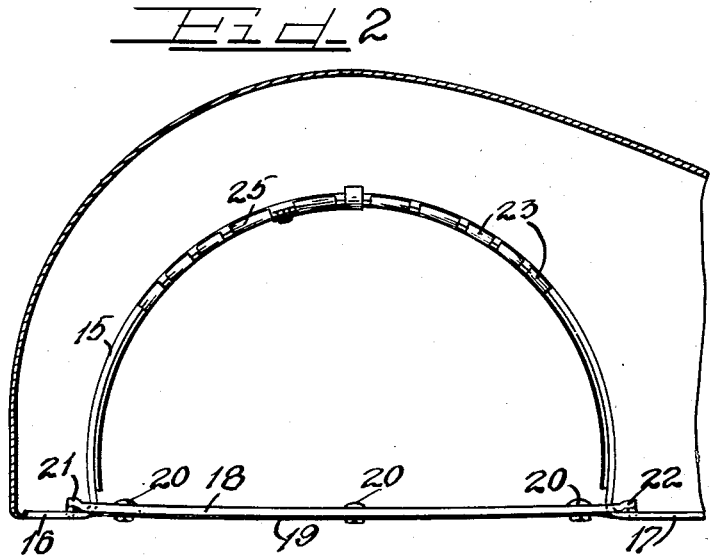
Inventor
Arthur P. Fergueson

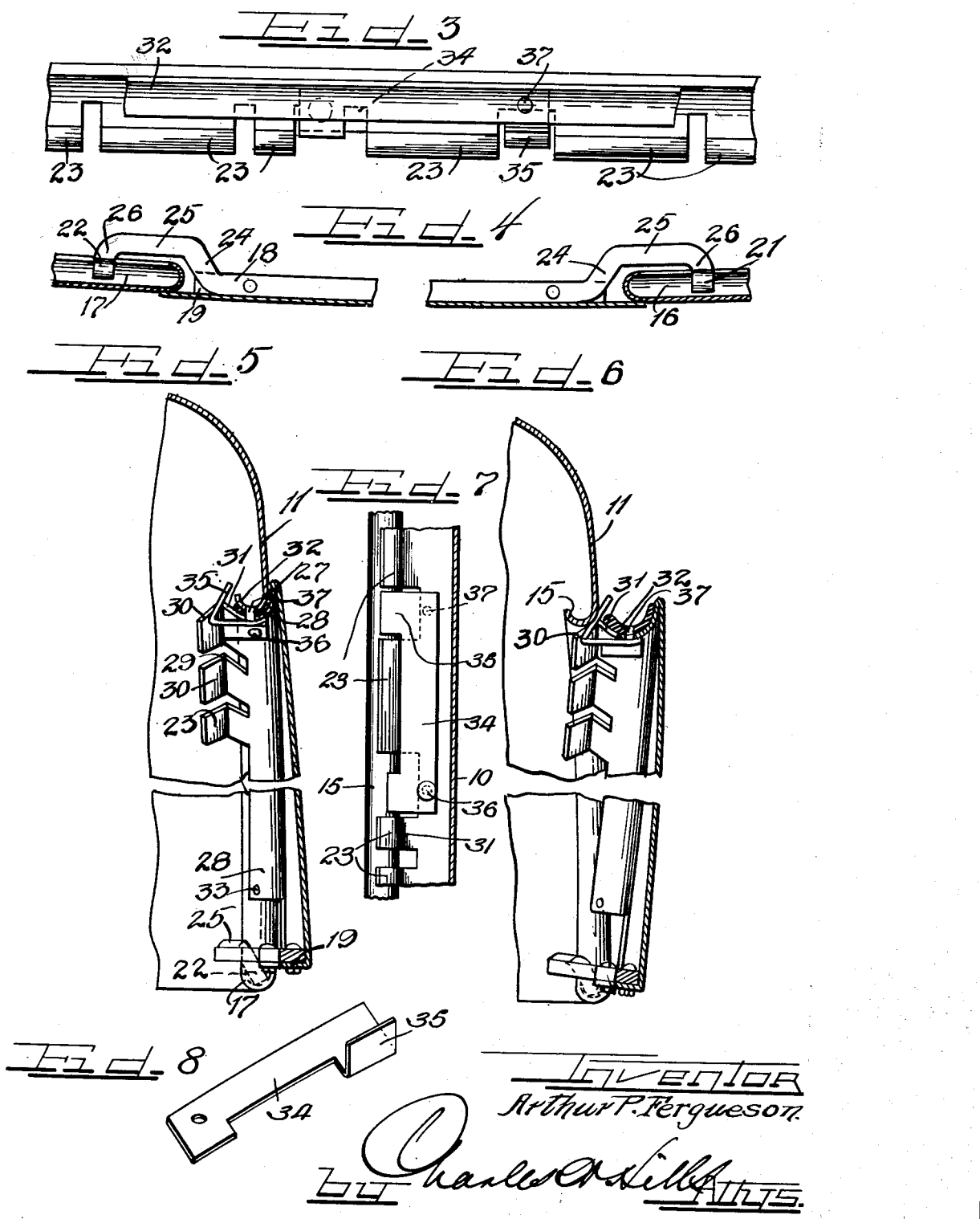

Patented Oct. 8, 1940

2,217,046

UNITED STATES PATENT OFFICE 2,217,046

FENDER SKIRT LATCHING MECHANISM

Arthur P. Fergueson, Detroit, Mich., assignor, by mesne assignments, to Houdaille-Hershey Corporation, Detroit, Mich., a corporation of Michigan Original application October 9, 1936, Serial No. 104,764. Divided and this application December 24, 1937, Serial No. 181,486

6 Claims. (Cl. 292—86)

This invention relates to ornamental fender skirts, and more particularly to a fender skirt latching mechanism.

This is a division of my copending application for "Ornamental fender skirt," Serial No. 104,764, filed October 9, 1936, issued as United States Letters Patent No. 2,122,563, July 5, 1938, and assigned to the same assignee as the present invention.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in an axial direction. Since this opening inherently presents an ugly outward appearance, detachable fender skirts have been employed to substantially cover this opening. As the term "fender skirt" shall hereinafter be employed, it refers to any member which is adapted to be secured to a fender for the purpose of covering that opening therein which is provided for access to and removal of a vehicle wheel.

In designing ornamental fender skirts, vehicle body engineers have sought to attain a design which would permit a quick and easy assembly of the fender skirt on a vehicle fender, which would be pleasing to the eye and enhance the general appearance of the vehicle, and which would be free from objectionable noise and vibration when the vehicle is in motion.

It is thus an object of this invention to provide a novel ornamental fender skirt which possesses the above highly desirable characteristics.

It is a further object of this invention to provide an improved fender skirt which is economical to manufacture and which is rugged and reliable in use.

It is still further an object of this invention to provide a novel ornamental fender skirt which is adapted to be held in detachable snap-on engagement with a vehicle fender.

Another object of this invention is to provide a novel ornamental fender skirt having trunnion members and resilient snap-on members for detachably retaining a fender skirt in desired position on a vehicle fender.

Another and further object of this invention is to provide a novel combination of vehicle fender and ornamental fender skirt.

A further object of this invention is to provide a novel fender skirt having means thereon for positively latching the fender skirt in desired position on a vehicle fender.

A still further object of this invention is to provide a novel ornamental fender skirt having cushioning means thereon to prevent rattling of the fender skirt on the vehicle fender when the vehicle is in motion.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

Figure 1 is a side elevational view of the rear part of an automobile showing a vehicle fender and one embodiment of my novel ornamental fender skirt mounted thereon;

Figure 2 is a side elevational view, partly in cross-section, of a vehicle fender and a fender skirt, as viewed from the wheel looking out;

Figure 3 is an enlarged fragmentary view of the upper marginal edge of the ornamental fender skirt;

Figure 4 is an enlarged fragmentary view illustrating the trunnion members of the ornamental fender skirt and the manner in which they engage the vehicle fender;

Figure 5 is an enlarged sectional end view of the ornamental fender skirt in its assembled position on the vehicle fender;

Figure 6 is an enlarged sectional end view of the ornamental fender skirt as it is being snapped into position on a vehicle fender;

Figure 7 is a transverse cross-sectional view of the upper part of the fender skirt showing the under side of the positive latching mechanism; and, Figure 8 is an isometric view of the leaf spring latch as shown in Figure 7.

In Figures 1 and 2 of the drawings, I have illustrated a fender skirt 10 constructed in accordance with the teachings of the present invention and assembled on a rear fender 11 of an automobile 12. The fender 11 is formed with the usual opening 13 which affords access to the vehicle wheel 14 and which permits ready removal of the wheel 14 in an axial direction. The ornamental fender skirt 10 is disposed over the opening 13 in such a manner as to substantially close the opening and to harmonize with the outer side wall of the fender 11. The outer surface of the skirt 10 may, of course, be substantially smooth, as is illustrated in the drawings, or it may assume any other desired configuration for purposes of ornamentation.

As shown in Figure 2, the outer marginal edge of the fender 11 which defines the opening 13 is underturned as at 15, while the outer marginal edges which define the base of the fender are underturned, as indicated at 16 and 17. As is well known by those skilled in the art, fenders of the high crown type are generally provided with these underturned edge portions to increase the rigidity of the fender. As will presently be explained, advantage is taken of this feature to assemble and secure an ornamental fender skirt in the fender opening.

In order to provide a suitable support for the fender skirt 10, a bar 18 is secured to the base 19 of the skirt in any suitable manner, such as by a plurality of bolts 20. The bar 18 is so dimensioned as to extent beyond either end of the skirt 10 to form trunnion members 21 and 22 which are adapted to be supported by the underturned edges 16 and 17, respectively, of the fender 11. A series of generally axially extending resilient fingers 23 along the curved edge portion of the skirt 10 are adapted to be cammed over the underturned edge 15 of the fender 11 into skirt retaining engagement therewith. Thus, by means of trunnion members 21 and 22 and the resilient fingers 23, the ornamental fender skirt 10 is securely and firmly mounted on the fender 11.

The particular configuration of the bar 18 which forms the trunnion members 21 and 22 may be seen best in Figure 4 of the drawings. In proximity to the junction points of the fender skirt with the fender 11, the bar 18 at either end is bent first axially inwardly as at 24, then radially outwardly as at 25, then axially outwardly as at 26, and finally downwardly into the portions which form the trunnion members 21 and 22. This particular formation of bar 18 permits the bar to freely extend around the underturned edge portion of the fender 11 at the junction point of the circular opening 13 with the base portion of the fender, as is necessary to permit the disposition of trunnion members 21 and 22 in the channel portion of the fender 11 formed by the underturned edges 16 and 17. With the bar 18 formed in this manner, the trunnion members 21 and 22 may be inserted in the underturned edge portions 16 and 17, and then the fender skirt 10 may be rocked or rotated in a plane substantially perpendicular to the plane of the skirt into the desired position on the fender 11.

In Figures 3 and 5 of the drawings, one form of resilient skirt retaining fingers or elements 23 is shown. As will be seen upon close inspection of the drawings, the resilient fingers 23 are formed by serrating a portion of the outer curved edge of the fender skirt 10. The outer portion of the skirt 10 along the entire curved edge is bent back on itself as at 27 along a line disposed inwardly of the serration to form a radially outwardly facing channel portion 28. The resilient fingers 23 are shaped to have an intermediate raised or humped portion. The resilient fingers 23 thus include a forward face 30 and a rear face 31. The forward face 30 constitutes a cam surface for guiding the resilient fingers 23 under the underturned marginal edge 15 of the fender 11, while the rear face 31 is adapted to secure the fingers against the rear surface of the underturned marginal edge portion 15.

In order to prevent rattling and other objectionable vibrations, it has been found desirable to secure a cushioning pad 32 of rubber or some other suitable material in the channel 28 to prevent a metal to metal contact between the fender skirt 10 and the underturned marginal edge 15 of the fender 11. The cushioning pad 32 may be secured to the ornamental fender skirt 10 in any desirable manner, such as by a rivet 33 at each end of the channel 28.

It has also been found desirable to provide some positive latching mechanism to prevent accidental removal of the fender skirt 10 from the fender 11. One form of latching mechanism which has been found highly satisfactory in operation is to provide a spring leaf 34 having a hooked end 35 which will engage the underturned marginal edge 15 of the fender 11 whenever the skirt 10 tends to rotate out of desired position. The spring leaf 34 is disposed beneath the channel 28 near the top of the fender skirt 10 and is firmly secured to the channel 28 at one end by some suitable means, such as a rivet 36. The free hooked end 35 of the spring 34 extends between two adjacent resilient fingers 23, as is clearly seen in Figure 3. The hooked end 35 of the spring 34 is bent slightly back on itself in order to permit this end to be cammed under the underturned marginal edge 15 of the fender 11.

Figure 6, which is a view substantially similar to that of Figure 5 shows the ornamental fender skirt 10 with the resilient fingers 23 and latching mechanism 34 out of engagement with the underturned marginal edge 15 of the fender 11. From this figure, the manner in which the resilient fingers 23 and spring 34 are cammed under the underturned marginal edge 15 of the fender 11 will readily be understood.

In order to permit access to the latching spring 34 from the front side of the fender 11, a hole or opening 37 is provided through the cushioning means 32 and channel 28 of the skirt at such a point as will permit a screw driver or other similar instrument to be pressed down between the corner 27 of the skirt 10 and the fender 11 into engagement with the spring 34. With such an implement, the free end of the spring 34 may be depressed to a sufficient extent to permit the hooked end 35 to pass under the underturned marginal edge 15 of the fender 11.

The manner of assembling and dismounting an ornamental fender skirt of the type referred to above will now be described.

The ornamental fender skirt 10 is moved into proximity to the opening 13 of the vehicle fender 11, and the trunnion members 21 and 22 are then moved into supporting engagement with the underturned edge portions 16 and 17 of the fender 11. The ornamental fender skirt 10 is then rotated or rocked about the trunnion members 21 and 22 into engagement with the fender 11. As the circular edge portion of the skirt 10 moves into engagement with the fender 11, the resilient fingers 23 are cammed under the underturned edge 15 of the fender 11, as is also the hooked end 35 of the latching spring 34. As the hump portions 29 of the fingers 23 are forced under the underturned edge 15, the fingers snap into tight skirt-retaining engagement with the outer extremity of the underturned edge 15. It will thus be seen that the fender skirt has made a simple snap-on engagement with the fender 11, it being only necessary to place the trunnion members 21 and 22 in place and then give the upper part of the fender skirt 10 a sharp push.

Any tendency for the upper part of the fender skirt 10 to move out of engagement with the fender 11 is checked by the hooked end 35 of the spring 34.

To dismount the fender skirt 10 from the fender 11, a suitable tool, such as a screw driver, is pried down between the bent portion 27 of the fender skirt 10 and the fender 11 through the opening 37 into engagement with the spring 34. By means of the tool, the spring 34 is depressed to a sufficient extent to permit the hooked end 35 to freely pass under the underturned edge 15 of the fender 11. The fender skirt 10 is then lifted to remove the trunnion members 21 and 22 from supporting engagement with the underturned edge portions 16 and 17, and the skirt is completely dismounted from the vehicle fender.

From the above description, it wil be apparent that I have provided an extraordinarily simple arrangement for mounting ornamental fender skirts on vehicle fenders which is economical to manufacture, which is rugged and reliable in use, and which may be readily assembled or disassembled on a vehicle fender by an unskilled person. By providing a fender skirt which may be assembled on a vehicle fender by a simple shove of the person assembling the skirt on the fender, it will be readily appreciated that I have provided an extremely desirable commercial article.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. In a fender skirt construction having means for supporting and securing said skirt on a fender, a supplemental latching device comprising a latching arm having a base portion secured to said fender skirt, an intermediate portion extending along the rear face and in proximity to an edge of said fender skirt, and a latching portion extending at right angles to said intermediate portion adapted to extend upwardly behind the front face of said fender into latching position.

2. In a fender skirt construction having means for supporting and securing said skirt on a fender, said supporting and securing means on said fender skirt including means thereon for normally holding said skirt on said fender, and an additional safety latching device comprising a resilient arm secured to said skirt at one end and having a hook shaped catch at its free end for extension upwardly behind the opening defining edge of said fender.

3. In a fender skirt construction having means for supporting and securing said skirt on a fender and including a rearwardly extending flange for extension through the wheel opening of a vehicle fender, a supplemental latching device comprising a resilient arm secured to said fender at one end and having a hook shaped catch at its free end for extension upwardly behind the opening defining edge of said fender, said flange being apertured in proximity to the free end of said arm for the insertion therethrough of a suitable tool to depress the catch of said arm into an unlatched position.

4. For an ornamental fender skirt of the type having a rearwardly extending flange for extension through the wheel opening of a vehicle fender, a latching device comprising a resilient arm secured to said skirt at one end and having a hook shaped catch at its free end extending upwardly and forwardly toward the front face of said skirt, whereby said catch will be cammed beneath the opening defining edge of said fender if said skirt is moved into position thereon.

5. For an ornamental fender skirt of the type having a rearwardly extending flange for extension through the wheel opening of a vehicle fender, a latching device comprising a resilient arm secured at one end to the under side of said flange and extending along the length of said flange, and a V-shaped latching finger secured to the free end of said arm near the extremity of one of the legs of the V, the apex of the V being rearwardmost and the other arm of the V extending upwardly and forwardly behind the front face of said fender.

6. In a fender skirt construction having a radially outwardly facing peripheral channel adapted to receive the edge of the wheel access opening in a vehicle body construction, the axially outer side of said channel overlapping the side of said vehicle body construction, a resilient latch member underlying said channel and having one end fixed thereto, the other end of said latch member extending axially inwardly from under said channel and radially outwardly beyond said channel, said channel being provided with an aperture above said latch member and spaced from the fixed end thereof, said aperture being adapted to be concealed by said edge of said vehicle body construction and by said axially outer side of said channel when said fender skirt is mounted on said vehicle body construction but to be accessible for the insertion of a latch deflecting and releasing instrument when said fender skirt is moved slightly axially outwardly from the mounted position thereof.

ARTHUR P. FERGUESON.